Dec. 6, 1955  A. HANSEN  2,725,815
MACHINES FOR TEMPERING CHOCOLATE AND SIMILAR MASSES
Filed July 18, 1951  2 Sheets-Sheet 1

Inventor:
Asgar Hansen
By Henderoth, Lind & Ponack
Attorneys

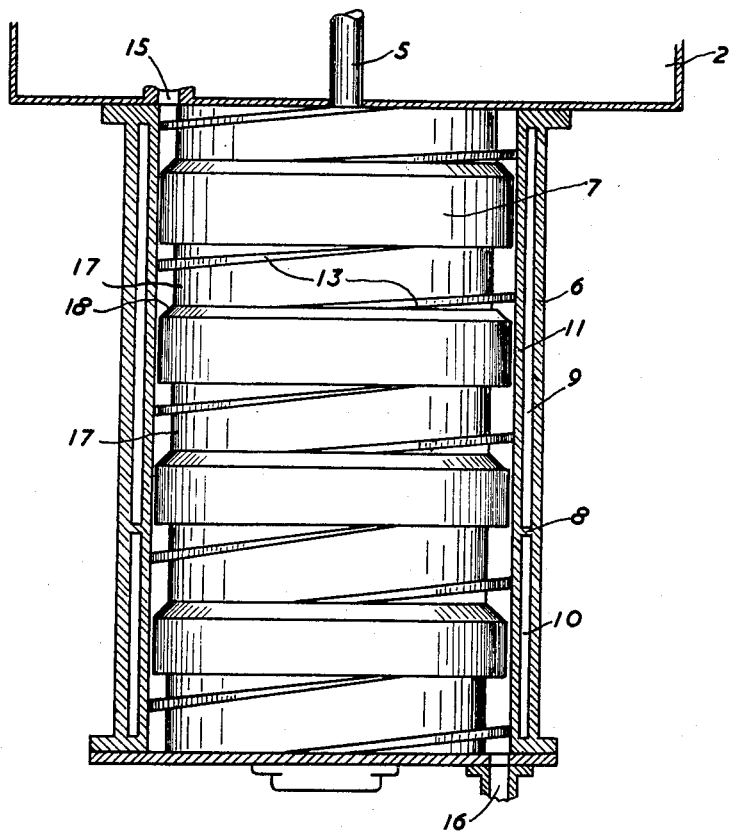

United States Patent Office 2,725,815
Patented Dec. 6, 1955

---

2,725,815

MACHINES FOR TEMPERING CHOCOLATE AND SIMILAR MASSES

Asgar Hansen, Herlev near Copenhagen, Denmark, assignor to Mikrovaerk A/S, Copenhagen, Denmark Application July 18, 1951, Serial No. 237,341
Claims priority, application Denmark December 8, 1950

3 Claims. (Cl. 99—236)

Tempering machines are known which comprise a cylindrical, jacket-shaped casing with means for maintaining a suitable temperature, said casing having a smooth inner wall surrounding a substantially drum-shaped propelling member with screw threads on the entire peripheral surface facing the case. For ensuring a uniform treatment of the mass that is being tempered in such a machine it is necessary that the screw threads of the propelling member have only a slight depth since otherwise the different parts of the mass will not be subjected to uniform heat influences.

This invention relates to a machine for tempering chocolate and similar masses and of the known type having a rotatable, substantially drum-shaped propelling member with screw threads for carrying the mass in contact with the wall of a casing enclosing the propelling member, said casing having means for cooling and/or heating the mass during its flow through the machine. The main characteristic feature of the machine in accordance with the invention is that the screw threads of the propelling member are divided into a number of groups separated from each other by thread-free surface portions which together with the oppositely located surface portions of the wall of the casing form narrow passages for the mass. In these narrow passages the mass can be subjected to an extremely intensive heat influence and also to a certain mechanical working on the mass, while at the same time the separated or interrupted screw threads of the propelling member ensure an intensive propulsion of the mass through the machine. During its motion through the machine, the mass is thus alternately subjected to an intensive propelling actuation and to an intensive heat influence.

The best propulsive effect on the mass being treated is obtained when in the machine in accordance with the invention the screw threads are projecting in relation to the thread-free portions of the surface of the propelling member and engage circumferential recesses in the wall of the casing. In this embodiment the propelling member may, by way of example, consist of a simple cylindrical drum with rails screwed on or otherwise secured to the surface of the drum for the formation of the screw threads.

In a preferred embodiment of the invention, each of the separate screw threads comprises at least slightly more than one full turn. By the limitation of each group of screw threads to about one full turn is attained that said turn can have a comparatively large pitch, so that the ratio between the propulsion velocity of the mass and the velocity of rotation of the drum can be large. At the same time, a return-flow of the mass must, however, be prevented or at any rate be counteracted, and therefore the two screw-thread ends in each group should overlap to a certain extent.

Two preferred embodiments of the tempering machine in accordance with the invention are illustrated by way of example on the drawing, in which—

Fig. 2 is a similar view of the other embodiment with certain portions broken away.

Figure 1:
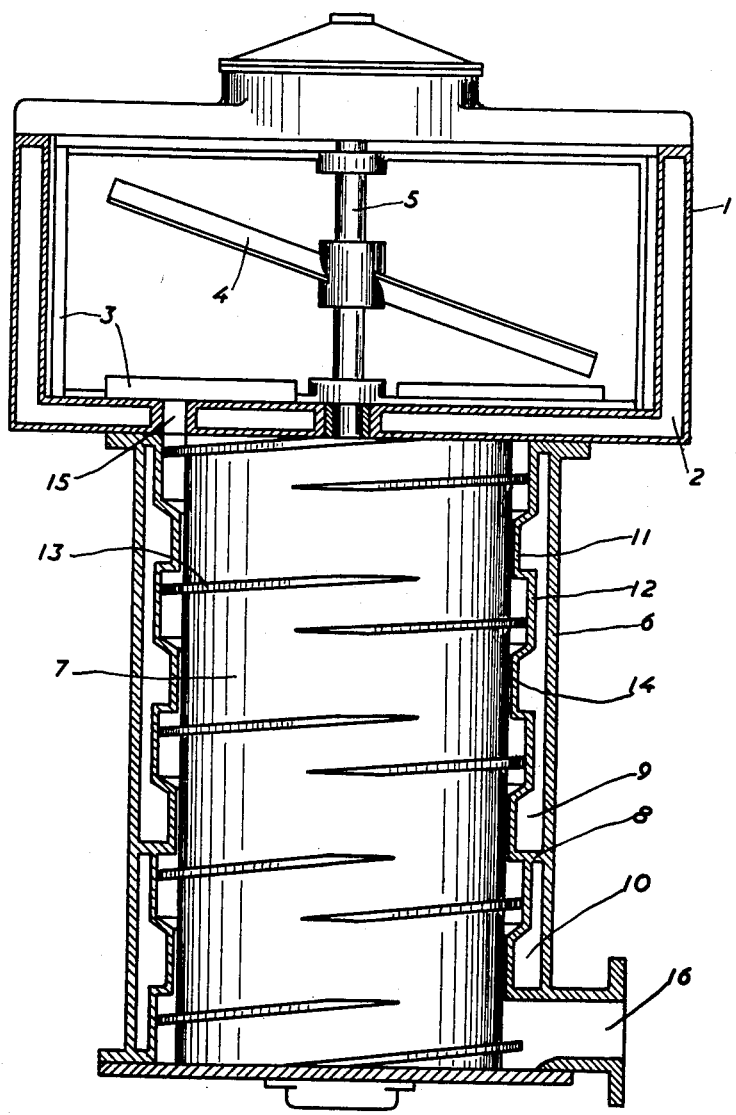
Fig. 1 is part sectional elevation of the first embodiment.

In the embodiment shown in Fig. 1, the machine comprises a supply container 1 with a hollow wall 2, through which water or some other heating or cooling fluid can flow. In the container a scraper 3 and a stirring member 4 are provided, said members being secured to a common rotating shaft 5.

The supply container 1 is carried by a conveyor comprising a casing 6 and a drum-shaped propelling member 7 enclosed in said casing and secured to the rotative shaft 5. The casing 6 contains a chamber which by a horizontal wall 8 is divided into two compartments 9 and 10. In the inner wall 11 of the casing 6 a number of recesses 12 are provided corresponding to the number of interrupted screw threads 13 or groups of screw threads on the drum-shaped propelling member 7. During the rotation of the drum 7, said screw threads serve for driving the mass that is being tempered downwards through the recesses 12 and through narrow passages 14 formed between the inner wall 11 of the casing 6 and the thread-free portions of the surface of the drum 7. In these narrow passages an intensive heat-treatment of the mass is effected, while at the same time the mass is subjected to a certain mechanical working (a combined kneading and squeezing action) during its motion through the passages. The space formed by alternately located recesses 12 and narrow passages 14 is through an inlet 15 above in communication with the supply container 1 and is below in communication with an outlet 16, from which the tempered mass can be discharged for further treatment.

During the operation of the machine there may, for example when chocolate mass is being tempered, be led cooling liquid through the upper compartment 9 of the chamber of the casing 6, while a fluid heated to a suitable temperature is passed through the lower compartment 10 of said chamber so that the chocolate mass is subjected to a slight rise in temperature before leaving the machine.

In the embodiment shown in Fig. 1 the screw threads 13 are formed integrally with the drum proper, but they may also be formed by rails or rules which by means of screws or in some other way are secured to the cylindrical drum 7.

Fig. 2 shows another embodiment of the propelling member 7 and casing 6 of the machine. The propelling member 7 here consists of a cylindrical or slightly conical drum, in the surface of which a number of circumferential recesses or grooves 17 are provided, the lower wall 18 of which may, as shown, be oblique in order to offer as slight a resistance as possible to the downward motion of the mass. The screw threads 13 are located in these recesses or grooves 17 and can therefore be said to lie retracted in relation to the thread-free surface portions of the drum, even if the top of the screw threads 13 may be of a slightly larger diameter than the thread-free portions in order to engage the inside of the inner wall 11 of the casing 6. Constructively it is an advantage of this embodiment of the machine that the inside of the inner wall 11 may be smooth, i. e. without recesses corresponding to the recesses 12 in Fig. 1, but on the other hand the drum 7 in Fig. 2 will have a slightly smaller propulsive effect on the mass than the drum 7 in Fig. 1, because the mass in the machine in accordance with Fig. 2 will have a greater inclination to participate in the rotary motion of the drum than when the recesses, in which the screw threads operate, are located in the stationary wall 11.

The machine in accordance with the invention may in different ways differ from the embodiments shown. By way of example, the supply container 1 with pertaining parts may be dispensed with and the casing 6 may be placed in communication with a chocolate magazine, and furthermore it may be mentioned that the casing 6 and the propelling member 7 may be mounted with a horizontal or oblique axis instead of, as shown, with a vertical axis.

I claim:

1. Apparatus for tempering chocolate, comprising in combination a casing having a circumferential wall, the inner surface of said casing being a surface of revolution, two end walls forming together with said circumferential wall a closed chamber, inlet and outlet means for said chamber, means for controlling the temperature of at least parts of said walls, a rotary body mounted in said chamber and having an outer surface which is a surface of revolution coaxial with said inner surface of the circumferential wall of the casing, said outer and inner surfaces forming together an annular space comprising a series of axially spaced circumferential channels alternating with slot-like passages, a series of axially spaced threads on said rotary body, said threads projecting into said circumferential channels for propelling the mass being tempered through the apparatus from said inlet to said outlet thereof, and means for rotating said body about the common axis of said surfaces.

2. Apparatus for tempering chocolate, comprising in combination a casing having a circumferential wall, the inner surface of said casing being a cylindrical surface having a series of axially spaced circumferential recesses, two end walls forming together with said circumferential wall a closed chamber, inlet and outlet means for said chamber, means for controlling the temperature of at least parts of said walls, a rotary body mounted in said chamber and having an outer cylindrical surface forming together with said cylindrical inner surface of the circumferential wall a series of axially spaced slot-like passages, a series of axially spaced threads on said cylindrical rotary body, said threads projecting into said circumferential recesses for propelling the mass being tempered through the apparatus from said inlet to said outlet thereof, and means for rotating said body about the common axis of said surfaces.

3. Apparatus as claimed in claim 1, wherein each of the separate threads on said rotary body comprises at least slightly more than one full turn.

References Cited in the file of this patent

UNITED STATES PATENTS

| | | |
|---|---|---|
| 845,940 | Garbutt | Mar. 5, 1907 |
| 1,971,314 | Lauenstein | Aug. 21, 1934 |
| 2,070,558 | Beck | Feb. 16, 1937 |
| 2,313,705 | Jack | Mar. 9, 1943 |
| 2,397,488 | Hougland et al. | Apr. 2, 1946 |
| 2,505,125 | List | Apr. 25, 1950 |

FOREIGN PATENTS

| | | |
|---|---|---|
| 33,472 | Netherlands | Aug. 15, 1934 |